United States Patent [19]

Lisowski

[11] Patent Number: 4,799,444
[45] Date of Patent: Jan. 24, 1989

[54] RAIL CLAMP

[75] Inventor: Walter E. Lisowski, Chicago, Ill.

[73] Assignee: Helm Products, Inc., Chicago, Ill.

[21] Appl. No.: 103,542

[22] Filed: Oct. 1, 1987

[51] Int. Cl.$^4$ .............................................. B63B 9/00
[52] U.S. Cl. ................................... 114/221 R; 248/62; 248/74.4; 248/316.6
[58] Field of Search .............. 248/74.4, 74.1, 62, 248/225.31, 230, 316.1, 316.6; 24/542, 443, 25, 24; 114/221 R, 343

[56] References Cited

U.S. PATENT DOCUMENTS

| | | | |
|---|---|---|---|
| 1,241,126 | 9/1917 | Kidd | 248/74.4 |
| 4,029,276 | 6/1977 | Zrelie | 248/74.1 |
| 4,194,459 | 3/1980 | Lisowski | 114/221 R |
| 4,338,875 | 7/1982 | Lisowski | 114/221 R |
| 4,526,333 | 7/1985 | Nabama et al. | 248/316.1 X |
| 4,624,374 | 11/1986 | Murtaugh | 211/60.1 |

OTHER PUBLICATIONS

Helm Products, Inc., 3515 N. Kenton Ave., Chicago, Ill. 1987.

Primary Examiner—Sherman D. Basinger
Attorney, Agent, or Firm—Leydig, Voit & Mayer

[57] ABSTRACT

A rail clamp is provided comprising a pair of substantially identical opposing side pieces or members in which the side members have a means for slidably interlocking with one another at one end of the side members, a semicircular portion located in in approximately the middle of each side member, a hole for fastening the two side members together after they have interlocked around a rail, and a hole for mounting auxiliary equipment to the rail clamp. The interlocking end comprises a hooking end and a receiving end such that the hooking end of the first side member can slidably interlock with the receiving end of the opposing side member. The hooking end has a hooking lip which forms a hooking channel and the receiving end has a receiving lip which forms a receiving channel such that the hooking lip slides into the receiving channel and the receiving lip slides into the hooking channel when the two opposing side members are brought into a face-to-face relationship.

5 Claims, 1 Drawing Sheet

U.S. Patent   Jan. 24, 1989   4,799,444
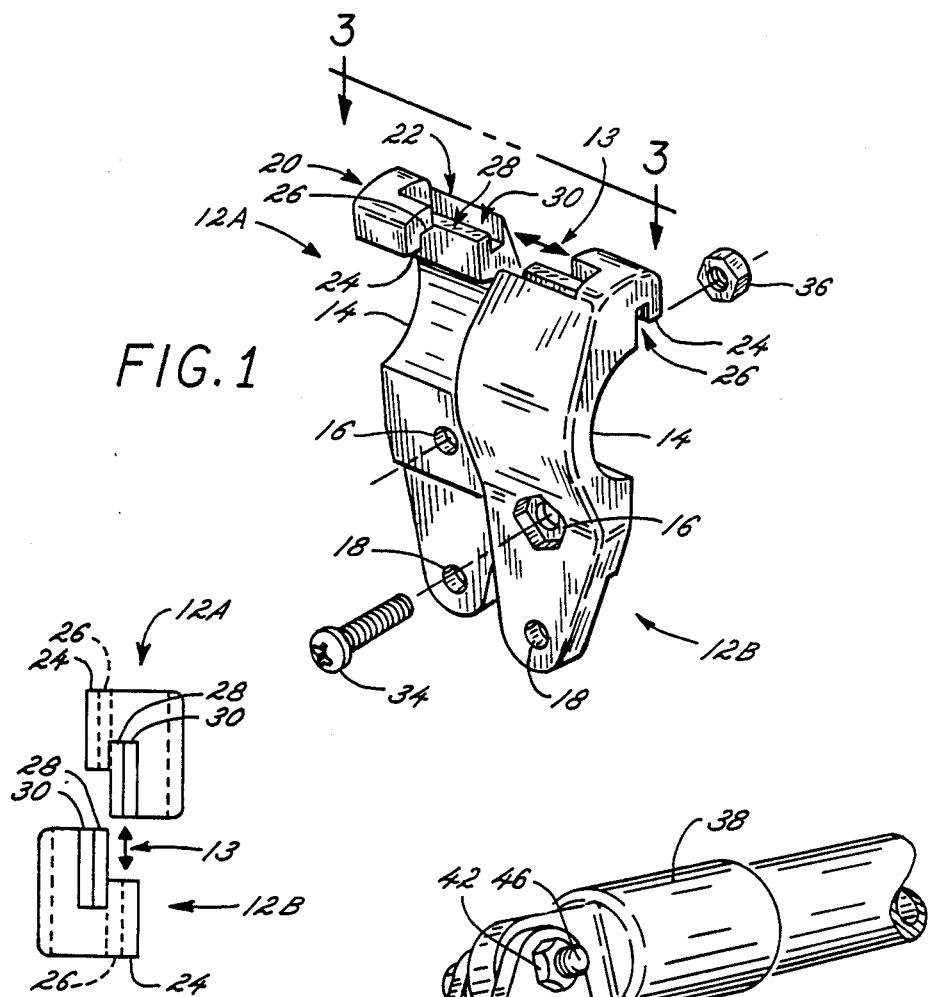
FIG. 1
FIG. 3
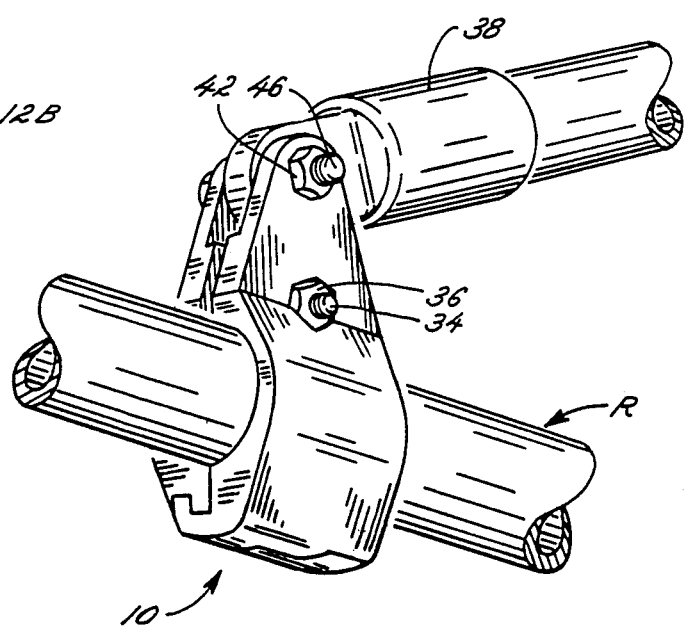
FIG. 2
FIG. 4

RAIL CLAMP

BACKGROUND OF THE INVENTION

This invention relates to a clamping device, more particularly, a rail clamp for marine applications.

As the popularity of boating has grown in recent years, so has the number of special equipment and accessories available for use on pleasure boats. Examples of such devices include expensive electronic equipment such as CBs and radar, fishing equipment, bimini tops and stringers for fender rails.

Typically, mounting this equipment requires dismantling the railing in order to slide an attachment device on the rail. However, when the railing is welded together, the equipment must be installed on the boat railing by drilling holes, placing screws, clamps, bolts, connectors, and the like all over the boat. The mounting techniques described above involve permanent connections and/or require special equipment to mount and dismount the boating accessories so that once equipment is mounted, it can not be moved to another part of the boat. Also, drilling holes, placing screws, clamps, or bolts is not only unattractive but it may ruin the integrity of the boat especially in fiberglass boats in which a hole may start hull cracks which grow at alarming speed.

Two examples of clamping devices used in boating applications are U.S. Pat. Nos. 4,194,459 and 4,338,875 to Lisowski. The clamping devices, although improvements on past attachment methods, are still complicated devices having numerous parts and elements and are cumbersome to use.

As may be expected, the boating equipment and accessories are extremely sophisticated and expensive. Because these boats are typically tied up in public places where this expensive equipment may be vandalized, stolen or abused, it is prudent to remove this gear. It is also exposed to the elements. Thus, the equipment must be mounted and then dismounted each time the boat is used. Since pleasure boats have extremely small crews, this equipment must be easily and quickly mounted and dismounted.

Also, the boats and the equipment and mounting devices are constantly exposed to the elements, to spray, and to high humidity which causes rust, corrosion, and general deterioration. To remedy this problem, the boat equipment is typically made of solid brass with suitable multi-layered plating, which is very expensive.

OBJECT OF THE INVENTION

Thus, to overcome these deficiencies, it is a principle object of the present invention to provide an improved means for mounting many different kinds of accessory equipment on boat rails and the like.

A further object is to provide a clamping device which is easily installed and removed without requiring an expensive and time consuming procedure and/or any special tools and which can be easily and quickly relocated as often as needed around boat rails or other such similar structures.

A further object is to provide a mounting device which rigidly and securely attaches to a rail.

Still another object is to provide a clamping device which has few components so it can be easily and inexpensively manufactured and still be able to withstand the extreme weather conditions present in marine environments.

SUMMARY OF THE INVENTION

These objects are accomplished by providing a clamping device made of two substantially identical interlocking side pieces or members which are shaped to fit over any convenient rail structure such as that of a boat rail. After the side pieces are interlocked together, they may be secured by either large head nuts or screws which may be fully tightened or removed with a conventional screwdriver. The side pieces are preferably made of stainless steel to withstand marine applications.

These and other features and advantages of the invention will be more readily apparent upon reading the following description of a preferred embodiment of the invention and upon reference to the accompanying drawings wherein:

BRIEF DESCRIPTION OF THE DRAWINGS

FIG. 1 is a perspective view of the clamping device of the present invention which shows substantially identical side pieces which slidably interlock together to clamp around a rail (not shown);

FIG. 2 is a profile view of one side piece of the invention;

FIG. 3 is a top view of two side pieces which shows how they slidably interlock; and FIG. 4 is a perspective view of the rail clamp showing the two side pieces interlocking together and supporting equipment and accessories such as a bimini top.

While the invention will be described and disclosed in connection with certain preferred embodiments and procedures, it is not intended to limit the invention to those specific embodiments. Rather, it is intended to cover all such alternative embodiments and modifications as fall within the spirit and scope of the invention.

DETAILED DESCRIPTION OF THE INVENTION

The operation of the rail clamp 10 may be understood upon reference to FIG. 1 which shows a perspective of two substantially identical but opposing side pieces or members 12A, B of the rail clamp 10. The letters "A" and "B" are used in order to differentiate between the parts of the first side piece 12A and the substantially identical parts of opposing side piece 12B, respectively. Each side piece 12A has a means for slidably interlocking with the opposing side piece 12B, generally depicted at 13, while preventing the side pieces 12A, B from rotating relative to each other; a semicircular portion 14 is located in approximately the middle of each side piece, 12A, B. A hole 16, having a hex shaped counter base, is provided for securely fastening the side pieces 12 A, B around a boat rail "R" with a bolt 34 and nut 36 and a hole 18 is also provided for mounting equipment to the rail clamp 10.

In order to join the two side pieces 12A, B together without the need for numerous and cumbersome screws or clamps, the interlocking means 13 comprises a hooking means 20 and a receiving means 22 such that the hooking means 20 of the first side piece 12A can slide into the receiving means 22 of the opposing side piece 12B. Thus, one end of the rail clamp 10 can be simply secured together to stay in place so that a boat operator can now easily mount or dismount the rail clamp 10 with the single bolt 34 and nut 36.

In the preferred embodiment shown in FIG. 1, both the hooking means 20 and the receiving means 22 are located at same end of the side piece 12 A, B and extend substantially one-half the width of the side piece 12A, B. Referring now to the profile of the side piece 12A, B depicted in FIG. 2, the hooking means 20 has an overhanging hooking lip 24 which forms a channel 26. Similarly, the receiving means 22 has a receiving lip 28 which forms a channel 30. The hooking lip 24, the receiving lip 28, and their respective channels 26, 30 are parallel to each other. When the two side pieces 12 A, B are brought together in a face-to-face relationship as shown in FIGS. 1 and 3, the hooking lip 24 can slide into the receiving channel 30 and the receiving lip 28 can slide into the hooking channel 26 thus forming an interlocking unit. Thus, when the receiving means 22 and hooking means 20 engage each other, the two side pieces 12A, B are precluded from pivoting or rotating relative to one another.

The rail claim 10 must be able to mount on the railing of a boat which typically, has a diameter of ⅞ inch or 1 inch. In addition, the boat rail must fit snugly between the internal semicircular portion 32 of each side piece 12A, B. Thus, the internal semicircular portion 14 of each side piece 12A, B has a cross-section approximately one-half of the diameter of the boat rail R. It will be appreciated that with the present arrangement the circular portions 14 can be almost a full 180° giving the maximum area of attachment contact with the side pieces 12 A, B surrounding the rail R.

In order to mount the rail clamp 10 to the boat rail R, the internal semicircular portions 14 of each side piece 12A, B are aligned with the boat rail R so that the hooking means 20 of side piece 12A can slidably engage the receiving means 22 of the other side piece 12B. When the hooking means 20 and receiving means 22 are aligned, the hole 16 for fastening the side pieces 12A, B together and the hole 18 for mounting equipment to the rail clamp 10 are also in alignment.

A single screw 34 and bolt 36 can be inserted through the fastening hole 16 in order to securely mount the rail clamp 10 to the boat rail R. Since the semicircular portion 14 is only slightly smaller than the diameter of the boat rail R, tightening the screw 34 forces the side pieces 12A, B to pivot about the interlocking means 13 subsequently forcing the side pieces 12A, B to tighten around the boat rail R.

In keeping with one of the objectives, the rail clamp 10 is not permanently mounted to the rail R and can be easily and quickly dismounted by removing the single screw 34, and slidably disengaging the two side pieces 12A, B.

Once the rail clamp 10 is secured to the boat railing, boating accessories, such as the bimini top 38 can be attached to the rail clamp 10. A typical piece of boating accessory such as a bimini top 38 can be easily attached to the rail clamp 10 as shown in FIG. 4. The end of the bimini top 38 is inserted between the side pieces 12A, B so that the hole in the end of the bimini top 38 aligns with the mounting hole 18 in the side pieces. Then, a single screw 40 and bolt 42 is used to securely fasten the bimini top 38 to the rail clamp 10. Although not shown here, other types of auxiliary devices or equipment may be attached to the rail clamp 10 by attaching it to the hole 18 or by adapting the ends of side pieces 12A, B to receive a different kind of attachment.

As stated previously, the two side pieces 12A, B are preferably identical and may therefore be made from a single mold pattern or die shape. The side pieces 12A, B may be made of any material which can withstand not only the harsh weather forces present in a marine environment but also the torsional forces that the rail clamp 10 will be subjected during normal use. Examples of such materials are stainless steel, nylon and polypropylene. Not only are these materials strong and will resist the rust and corrosion, but they are also relatively inexpensive when compared to traditional marine materials such as brass. The present rail clamp 10 is easily and inexpensively manufactured not only because of the inexpensive materials used but also because the side pieces 12A, B are identical and can be made with only one mold pattern. As a result, production of the rail clamp 10 is less expensive, faster and requires less complex equipment or parts inventories.

It will be also appreciated that while the changes of the present invention have been particularly described as being very useful for marine environments, it is not so limited and may be used, for example, in many different area such as hospitals, factories, vehicles and even in the home where rail attachments are desired.

I claim as my invention:

1. A rail clamp comprising a pair of substantially identical opposing side members, each side member having
   (a) a parallel slidably interlocking means at one end of the side member having a receiving means and a hooking means wherein the hooking means includes a hooking lip which forms a hooking channel and the receiving means includes a receiving lip which forms a receiving channel such that the hooking lip and hooking channel of the first side member slidably interlocks with the receiving channel and receiving lip, respecitvely, of the second side member to prevent the side members from pivoting about a rail,
   (b) a holding means for mounting auxiliary devices to the clamp at the other end of the side member,
   (c) a semicircular portion disposed between the ends and adapted to surround approximately one half of the rail between each of the side members when positioned against the rail, and
   (d) a means for fastening the individual side members together when the pair of side members have the slidably interlocked means interlocked together with a rail positioned between the respective semicircular portions.

2. The rail clamp of claim 1 wherein the fastening means includes bore means transversely through each side member which align when the side members are interlocked at their ends, and a bolt and nut means to tighten the two side members together.

3. A rail clamp of claim 2 wherein the bores of the fastening means are located between the semicircular portion and the holding means ends of the side member.

4. A rail clamp of either claim 2 or claim 3 wherein the bore includes hex-shaped counter bores.

5. The rail clamp of claim 1 wherein the holding means comprise each side member having a transverse bore hole which align when the side members are interlocked at their ends so that auxiliary devices can be attached to the rail clamp by separate fastening means.

* * * * *